United States Patent
Misra et al.

(10) Patent No.: US 11,386,463 B2
(45) Date of Patent: Jul. 12, 2022

(54) METHOD AND APPARATUS FOR LABELING DATA

(71) Applicant: AT&T Intellectual Property I, L.P., Atlanta, GA (US)

(72) Inventors: Sanjeev Misra, Somerset, NJ (US); Appavu Siva Prakasam, New Providence, NJ (US); Ann Eileen Skudlark, San Ramon, CA (US); Siva Kolachina, Plano, TX (US); Nisha Shahul Hameed, Bellevue, WA (US); Prashanth Boddhireddy, Plano, TX (US); Lien Tran, Seattle, WA (US); Jenq-Chyuan Wang, East Hanover, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/866,798

(22) Filed: May 5, 2020

(65) Prior Publication Data
US 2021/0182912 A1    Jun. 17, 2021

Related U.S. Application Data

(60) Provisional application No. 62/949,143, filed on Dec. 17, 2019.

(51) Int. Cl.
*G06Q 30/02*    (2012.01)
*G06F 16/35*    (2019.01)
(Continued)

(52) U.S. Cl.
CPC ....... *G06Q 30/0269* (2013.01); *G06F 16/355* (2019.01); *G06F 16/93* (2019.01);
(Continued)

(58) Field of Classification Search
USPC ............................................. 705/319, 14.66
See application file for complete search history.

(56) References Cited

U.S. PATENT DOCUMENTS

| 10,198,431 B2* | 2/2019 | Somasundaran ..... G06F 40/295 |
| 2009/0138342 A1* | 5/2009 | Otto ....................... G06Q 30/02 |
|  |  | 706/45 |

(Continued)

OTHER PUBLICATIONS

Sentiment Classification using Document Embeddings trained with Cosine Similarity, Thongtan (Year: 2019).*

(Continued)

*Primary Examiner* — Gautam Ubale
(74) *Attorney, Agent, or Firm* — Guntin & Gust, PLC; Mark Wilinski

(57) ABSTRACT

Aspects of the subject disclosure may include, for example, determining classes from a corpus based on topic modeling, data clustering and unsupervised learning. Labels are determined for each of the classes and trained models are generated for each of the classes by assignment of a plurality of textual documents to labels based on a highest number of matches. A raw textual document can be tokenized and stop words removed. A corresponding one of the trained models can be selected according to a class that is applicable to subject matter of the raw textual document. The processed document can be assigned to a target label based on a highest number of matches of words. Other embodiments are disclosed.

19 Claims, 14 Drawing Sheets

(51) Int. Cl.
*G06F 16/93* (2019.01)
*G06F 40/295* (2020.01)
*G06N 5/04* (2006.01)
*G06Q 10/10* (2012.01)
*G06N 20/00* (2019.01)

(52) U.S. Cl.
CPC ............ *G06F 40/295* (2020.01); *G06N 5/04* (2013.01); *G06N 20/00* (2019.01); *G06Q 10/107* (2013.01); *G06Q 30/0275* (2013.01)

(56) References Cited

U.S. PATENT DOCUMENTS

| | | | |
|---|---|---|---|
| 2011/0153501 A1* | 6/2011 | Agarwal | G06Q 50/184 705/26.1 |
| 2011/0202334 A1* | 8/2011 | Abir | G06F 40/55 704/4 |
| 2012/0179453 A1* | 7/2012 | Ghani | G06F 16/355 704/9 |
| 2013/0066818 A1* | 3/2013 | Assadollahi | G06N 20/00 706/12 |
| 2013/0166303 A1* | 6/2013 | Chang | G06F 16/7834 707/723 |
| 2013/0204885 A1* | 8/2013 | Clinchant | G06V 30/18152 707/E17.073 |
| 2014/0150016 A1* | 5/2014 | Feng | H04N 21/812 725/34 |
| 2014/0337308 A1* | 11/2014 | De Francisci Morales | G06F 16/958 707/708 |
| 2016/0110343 A1* | 4/2016 | Kumar Rangarajan Sridhar | G06F 40/216 704/9 |
| 2016/0203209 A1* | 7/2016 | Clinchant | G06F 16/353 707/738 |
| 2017/0060835 A1* | 3/2017 | Radford | G06F 40/284 |
| 2017/0147944 A1* | 5/2017 | Csurka | G06N 3/02 |
| 2017/0161633 A1* | 6/2017 | Clinchant | G06N 5/02 |
| 2018/0018316 A1* | 1/2018 | Bogdan | G06F 16/285 |
| 2018/0285459 A1* | 10/2018 | Soni | G06F 16/93 |
| 2020/0005194 A1* | 1/2020 | Rao | G06F 16/40 |
| 2020/0111023 A1* | 4/2020 | Pondicherry Murugappan | G06Q 10/0631 |
| 2020/0311150 A1* | 10/2020 | Srinivasaraghavan | G06F 16/9038 |
| 2020/0320086 A1* | 10/2020 | Liu | G06F 16/313 |
| 2020/0349229 A1* | 11/2020 | Abudalfa | G06N 7/005 |
| 2020/0401949 A1* | 12/2020 | Dangi | G06Q 30/0241 |
| 2021/0034814 A1* | 2/2021 | Aggarwal | G06N 20/20 |

OTHER PUBLICATIONS

Application of improved Bayesian model based on cosine similarity weighted in prediction of disease classification (Year: 2017).*
Unsupervised Learning of Sentence Embeddings using Compositional n-Gram Features (Year: 2018).*
Statistical Models for Text Segmentation (Year: 1999).*
A Hidden Markov Model Based System for Entity Extraction from Social Media English Text (Year: 2015).*
Automatic Text Document Summarization using Semantic-based Analysis (Year: 2018).*
Enhancing_Predictive_Power_of_Cluster-Boosted_Regression_With_Text-Based_Indexing (Year: 2019).*
Resolving_Ambiguities_in_Named_Entity_Recognition_Using_Machine_Learning (Year: 2017).*
A Brief Survey of Text Mining: Classification, Clustering and Extraction Techniques (Year: 2017).*
Named Entity Recognition in Twitter using Images and Text (Year: 2017).*
Text Extraction and Clustering for Multimedia: A review on Techniques and Challenges (Year: 2019).*

* cited by examiner

Step 1
201
Data Prep and Preprocessing
- Tokenize
- Remove stop words
- Bigram & trigram models
- NER

Step 2
202
Create classes/buckets for the corpus using
 a. LDA TM
 b. K-means Clustering Using GloVe word embedding

Step 3
203
- Engineer super features using results from steps 2a & 2b, boosted by a factor of 5, using Cosine Similarity on GloVe vectors
- Each of these super features represent a class/label

Step 4
204
- We pass each document through the set of super features from step 3.
- We use a voting mechanism and the feature that gets the largest number of votes we assign the document to that label

| Title | Native Genre | Classified as |
|---|---|---|
| Feature Films | | |
| X-Men | Science fiction, Action, Fantasy, Adventure | grp_Action_Thriller_With_Superhero |
| The Dark Knight | Fantasy, Action, Thriller, Adventure | grp_Action_Thriller_With_Superhero |
| Insomnia | Thriller, Crime drama | grp_Thriller_Mystery |
| Red Dragon | Thriller, Crime drama | grp_Thriller_Mystery |
| Jack Ryan: Shadow Recruit | Action, Thriller | grp_Spy_Adventure |
| Rowing Through | Drama | grp_Movies_Featuring_Sports |
| Mystery, Alaska | Comedy | grp_Movies_Featuring_Sports |
| Golgotha | Historical Drama | grp_Movies_Featuring_Religious_Theme |
| For Greater Glory | Historical drama | grp_Action_Movies_Featuring_War_WorldWar |
| Operation Crossbow | War, Drama | grp_Action_Movies_Featuring_War_WorldWar |
| Home & DIY | | |
| The Best of the Joy of Painting | How-to, Art | grp_Craft_Art_Quilting_Knitting_Jewelry |
| Tanked: Merry Fishmas | How-to, Animals | grp_Craft_Art_Quilting_Knitting_Jewelry |
| Sess It All | How-to | grp_How_To_Auto |
| Classic Rides | How-to | grp_How_To_Auto |
| Hometime | How-to, House/garden, Home Improvement | grp_Home_Improvement_And_Makeover |
| Sheffield Real Estate | Reality, Home Improvement | grp_Real_Estate_And_Flipping |
| House Hunters | Reality, House/garden | grp_Real_Estate_And_Flipping |
| A Gardener's Diary | How-to, House/garden | grp_Garden_Landscape_Trees_And_Shrubs |
| Scripted TV Shows | | |
| Law & Order | Crime drama | grp_Legal_Crime_Drama |
| Matlock | Drama, Mystery | grp_Legal_Crime_Drama |
| Eight is Enough | Comedy drama | grp_Romantic_Drama_Comedy |
| John Adams | Historical drama | grp_Historical_Drama_Docudrama |
| Downton Abbey | Historical drama | grp_Historical_Drama_Docudrama |
| Alien Nation | Science fiction, Crime drama | grp_SiFi_Fantasy |

Label or microgenre 213

Class or enhanced genre 212

| TMSID | Title | Year of Release | Description | Category | Enhanced Genre |
|---|---|---|---|---|---|
| MV###### | Movie X | 2017 | A security agent ambushed during transport of a valuable antique from Shanghai, battles his way through a gang to reclaim the item with the help of his team | Feature Film | Action movies featuring spies |
| EP###### | Show X | 2018 | Brian enters a dog show competition because of being smitten with a female show dog. Chris is being convinced by Peter and Lois that Arthur Valentine does not exist. | Sitcom | Animated shows |
| EP###### | NBA Basketball | 2019 | From Barclays Center in Brooklyn, N.Y. | Sports event | Basketball based sports events |

270
FIG. 2I

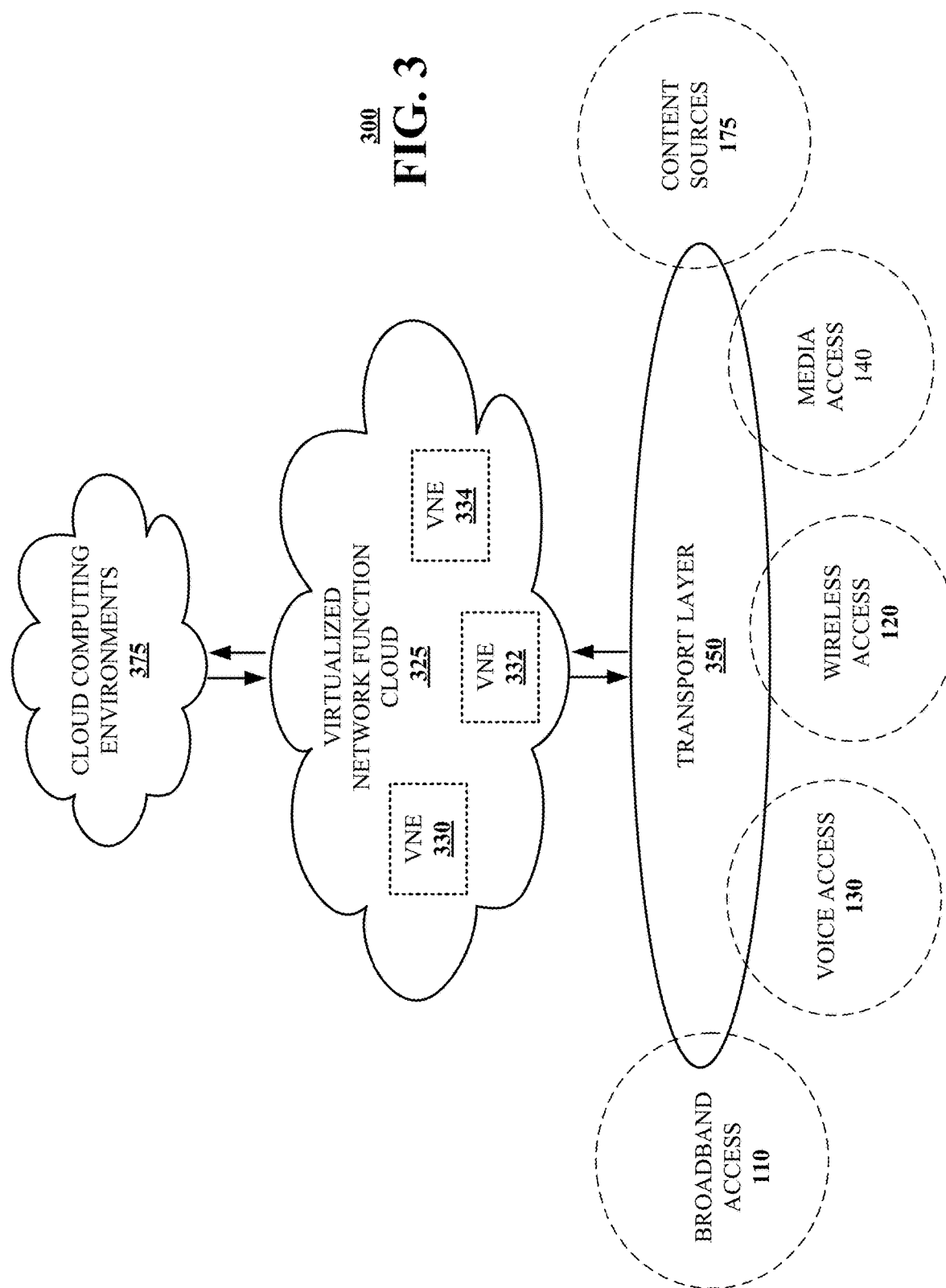

METHOD AND APPARATUS FOR LABELING DATA

CROSS REFERENCE TO RELATED APPLICATIONS

This application claims the benefit of priority to U.S. Provisional Application No. 62/949,143, filed Dec. 17, 2019. The contents of each of the foregoing are hereby incorporated by reference into this application as if set forth herein in full.

FIELD OF THE DISCLOSURE

The subject disclosure relates to a method and apparatus for labeling data.

BACKGROUND

Unstructured data (e.g., textual data) has become an important source of information that can be analyzed to the benefit of both businesses and consumers of such data, such as classification of similar data for stratification and understanding. However, textual data is rarely labeled and can be an expensive (e.g., time and cost) process to manually perform such as for text documents, websites, media contents, etc., for classifications purposes. Document labelling of media content or other documents can be performed manually, using a pool of in-house experts, or through crowd sourcing, but includes the drawbacks described above. Manual labeling is expensive, time consuming, and is subject to consistency issues due to human curator biases.

Descriptions of media content, such as in a media catalog, can be ambiguous. The current genres and keywords for media content are often inconsistent and generic in their nature. That is, it is difficult to identify media content unambiguously since there are multiple labels and keywords that are either too generic or non-descriptive of the content.

BRIEF DESCRIPTION OF THE DRAWINGS

Reference will now be made to the accompanying drawings, which are not necessarily drawn to scale, and wherein:

FIG. 2A depicts an illustrative embodiment of a method in accordance with various aspects described herein.

FIG. 2D depicts an illustrative embodiment of a data structure in accordance with various aspects described herein.

FIG. 2I depicts an illustrative embodiment of a data structure in accordance with various aspects described herein.

FIG. 3 is a block diagram illustrating an example, non-limiting embodiment of a virtualized communication network in accordance with various aspects described herein.

DETAILED DESCRIPTION

Figure 1:
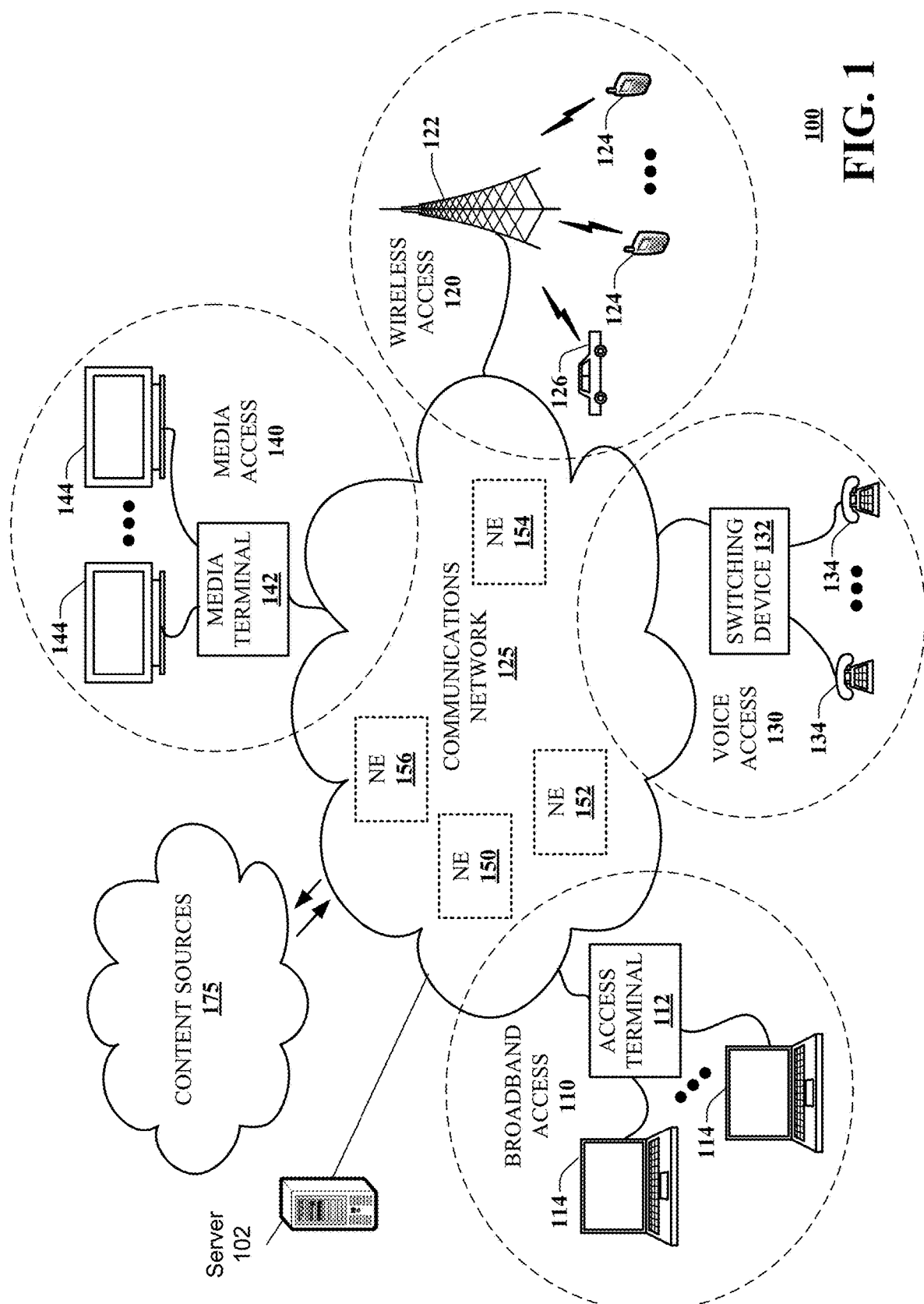
FIG. 1 is a block diagram illustrating an exemplary, non-limiting embodiment of a communications network in accordance with various aspects described herein.

The subject disclosure describes, among other things, illustrative embodiments for labeling or otherwise characterizing data such as to create automated labels of textual data that can be used in clustering and classification of textual documents. In one or more embodiments, a method and apparatus can create automated labels for unstructured data, such as unstructured textual data. As another example, different levels of labels or descriptors (e.g., enhanced genre and microgenre) can be generated and assigned to content for a media catalog. As another example, different levels of labels or descriptors can be generated and assigned to other types of data (e.g., textual data) that is representative of emails, reports, websites, articles, media content and so forth.

In one or more embodiments, unsupervised models can be utilized to create feature sets that allow the creation of automated labels for large sets of documents, including textual documents. For example, a unique set of labels or descriptors (e.g., microgenres) can be produced for media content, such as for movies and TV programs in a catalog of viewing content. In this example, the microgenres can have greater levels of detail or descriptiveness as to the content, which can provide information beyond generic genres such as "action", or "comedy." In one or more embodiments, the process described herein can be applied to any large sets of textual data. In one or more embodiments, the process automates labeling of any set of textual data from existing metadata without explicit manual labeling of some or most of the documents.

In one or more embodiments, labels are created for data, such as textual data. For example, a document can be created from metadata of each of the movies and TV programs or other content in a catalog. A corpus of documents can be created using some or all available content. In one embodiment, preprocessing can be applied such as employing Natural Language Processing (NLP) processes to tokenize, remove stop words, create bigram and/or trigram models, and/or to apply name entity recognition analysis. Continuing with this example, the labels can be generated by implementing a number of steps. For example, several Latent Dirichlet Allocation (LDA) topic models can be fit or otherwise applied to the corpus, where the LDA topic models have varying numbers of topics. Each of the models can be compared using a coherence model to find the topic models that best fit the data which indicates or otherwise determines the number of classes and labels (e.g., microgenres) applicable to the textual corpus of documents. The tokenized corpus can be converted into a vector (e.g., a 300 dimension vector, although other sizes of dimensions can also be utilized) using a pre-trained word embedding algorithm or model (e.g., a GloVe word embedding) in order to cluster the words into similar meaning groups. Feature sets can then be generated from the clusters of words for each of the classes that had been identified from the topic model. In one or more embodiments, a boosting process can also be applied, such as boosting each feature which had been created using cosine distance by a factor of 3 to 5. Super features can be created to hedge against new content with tokens that are alien to the features and class that have been created. A voting mechanism can be employed to assign labels to the documents/contents with the label (e.g., microgenre) that gets the most votes, and a data set can thus be built for training deep learning models. In one or more embodiments, a robust set of labeled data can be generated for training prediction models.

In one or more embodiments, a content classification process can be implemented that removes ambiguity in native genre classification in a content catalog of programs. For example, the process can include creating a set of unique and non-overlapping enhanced genre and further classifying each enhanced genre into non-overlapping microgenres. For instance, all of the media contents in the catalog (e.g., ~8.3M contents) can be clustered into distinct and non-overlapping enhanced genres, which can be any number, such as less than 100 (e.g., 34 classes or enhanced genres). In one embodiment, each piece of content can be assigned to only one of these enhanced genres. These enhanced genres can be created using heuristics that are derived using clustering of native genre and keywords. Algorithms (e.g., Cosine Similarity on GloVe vectors) can be applied to each of the enhanced genres to identify the number of microgenres for each enhanced genre so that the labels can be created. The resulting labeled data can be utilized to build a deep learning neural network model, such as one for each of the enhanced genres. Once each of these models is trained, they can be deployed to classify and tag new content that is being distributed (e.g., new movies and new TV shows added to the catalog) with the enhanced genre and microgenres.

In one or more embodiments, these enhanced genre and microgenres can be further used in other analytical processes. For example, enhanced genre and microgenres describing in more detail particular content can be utilized in electronic advertising to assist publishers in selling ad space, to facilitate buying decisions by buyers or bidders (e.g., direct sales or pre-bidding auctions), and/or to provide more detailed performance information regarding ad placement. In another example, the enhanced and microgenres describing in more detail particular content can be utilized in generating user profiles, family profiles, household profiles, subscriber profiles, and/or other viewer groupings that profile consumption in a more detailed fashion. This type of detailed viewer profiling can be used in a number of different ways including facilitating targeting advertising. In another example, the enhanced genre and microgenres describing in more detail particular content can be utilized in engagement modeling of audiences. In another example, the enhanced genre and microgenres describing in more detail particular content can be utilized in vulnerability or cancellation modeling to facilitate determining or otherwise predicting subscribers that are more likely to switch service providers. In one or more embodiments, the methods described herein can be utilized to generate viewer profiling data which is then utilized as input for other models. In one embodiment, a term frequency-inverse document frequency technique can be utilized, which involves a numerical statistic that reflects how important a word is to a document in a corpus. In one or more embodiments, the viewer profiling data can be utilized for determining an enthusiast or a non-enthusiast user with respect to a document, a media content, a type of content, a characteristic of particular content, a method of delivery of content (e.g., VOD) and so forth. For instance, the exemplary embodiments can be utilized to identify a user that is an enthusiast or a non-enthusiast for a particular genre or microgenre of media content, such as based on content consumption history of the user represented by the viewer profiling data. In one embodiment, the identification of an enthusiast or non-enthusiast can be extended to targeting advertising such as selecting candidates or characteristics of candidates that are likely to be interested in particular products or services. In one embodiment, the identifying of an enthusiast or non-enthusiast can be utilized as a component in understanding user behavior that can be applied to a particular user or a group of users.

In one or more embodiments, predictive models are built and stored to classify textual data, such as descriptions of media content (e.g., Electronic Program Guide (EPG) or Internet Movie Database (IMDb) data), news reports, emails, text, websites, visual media, text messages, and so forth. In this example, labeled data can be utilized to train models that can predict and classify textual contents.

In one or more embodiments, the exemplary methods describe herein can be utilized with visual media that can include metadata describing content. In one or more embodiments, the text being analyzed can be in the data (e.g., emails, articles, closed captioning, text messages, etc.) or can be metadata describing the content (e.g., IMDb and/or EPG data). In one or more embodiments, the textual document can be or can be generated from an analysis of closed captioning of a movie, TV show or other media program to describe a subject matter of content.

In one or more embodiments, documents can be obtained or otherwise generated that textually describe content where the documents are generated according to image pattern recognition applied to images of the content, such as for describing still images or for describing video.

In one or more embodiments, textual documents describing media content can be obtained from a single source or from multiple sources such as IMDb data, TV guide data, TMS, Gracenote, and so forth. For example, the metadata being modeled can be from any source or combinations of sources that is descriptive of content. In one or more embodiments, the types of models being employed, such as Latent Dirichlet Allocation (LDA), Deep Neural Networks (DNN) or Convolutional Neural Networks (CNN) can change based on a type of content such as whether the data is content descriptive metadata, images, or texting. In one or more embodiments, multiple documents corresponding to a single content (e.g., different sources) can be utilized. For example, cross-referencing for labeling accuracy can be provided; the multiple documents can be aggregated to provide further levels of details; and/or redundancy between the multiple documents can be removed.

In one or more embodiments, the classes and labels applied to the content can be used in other analytical processes, like recommendation systems, advertising campaigns, content negotiations, and so forth. Other embodiments are described in the subject disclosure.

One or more aspects of the subject disclosure is a method that includes generating, by a processing system including a processor, a corpus from a plurality of textual documents describing content of a media catalog. The method includes determining, by the processing system, classes from the corpus based on LDA topic models having different numbers of topics, K-means clustering and an unsupervised learning process that generates vector representations of words resulting in vectors. The method includes generating, by the processing system, trained models for each of the classes by determining labels for each of the classes using a cosine similarity function applied to the vectors and by assigning each of the plurality of textual documents to a selected one of the labels via a voting mechanism that counts matches of words to the labels. The method includes receiving a raw textual document describing other content that has been added to the media catalog. The method includes processing, by the processing system, the raw textual document to generate a processed document by applying one or more of tokenizing, removing stop words, bigram and trigram modeling, and name entity recognition analysis to the raw textual document. The method includes selecting, by the processing system, a corresponding model from among the trained models according to a class of the classes that is applicable to subject matter of the raw textual document. The method includes assigning, by the processing system, the processed document to a target label of the labels of the corresponding model via the voting mechanism that counts matches of words in the processed document to the labels of the corresponding model.

One or more aspects of the subject disclosure include a device having a processing system including a processor; and a memory that stores executable instructions that, when executed by the processing system, facilitate performance of operations. The operations can include generating a corpus from a plurality of textual documents. The operations can include applying a group of LDA topic models to the corpus, where the LDA topic models have different numbers of topics. The operations can include comparing, via a coherence model, the group of LDA topic models to select a number of labels for classes of the corpus. The operations can include applying, to the corpus, K-means clustering and an unsupervised learning process that generates vector representations of words to cluster the words into similar meaning groups. The operations can include determining feature sets from the clusters of words for each of the classes using a cosine similarity function, where the feature sets represent the labels. The operations can include generating trained models by assigning each of the plurality of textual documents to a selected one of the labels via a voting mechanism that counts matches of words in each document of the plurality of textual documents to the labels. The operations can include receiving and processing a raw textual document to generate a processed document by applying one or more of tokenizing, removing stop words, bigram and trigram modeling, and name entity recognition analysis to the raw textual document. The operations can include selecting a corresponding model from among the trained models according to a class of the classes that is applicable to subject matter of the raw textual document. The operations can include assigning the processed document to a target label of the labels of the corresponding model via the voting mechanism that counts matches of words in the processed document to the labels of the corresponding model.

One or more aspects of the subject disclosure include a machine-readable medium, comprising executable instructions that, when executed by a processing system including a processor, facilitate performance of operations. The operations can include generating a corpus from a plurality of textual documents by applying Natural Language Processing to the plurality of textual documents. The operations can include determining classes from the corpus based on machine learning associated with topic modeling, data clustering analysis and an unsupervised learning process that generates vector representations of words resulting in vectors. The operations can include generating trained models for each of the classes by determining labels for each of the classes using a cosine similarity function applied to the vectors and by assigning each of the plurality of textual documents to a selected one of the labels based on a highest number of matches of words in each document of the plurality of textual documents to the labels. The operations can include processing a raw textual document to generate a processed document by applying Natural Language Processing to the raw textual document. The operations can include selecting a corresponding model from among the trained models according to a class of the classes that is applicable to subject matter of the raw textual document. The operations can include assigning the processed document to a target label of the labels of the corresponding model based on a highest number of matches of words in the raw textual document to the target label.

Referring now to FIG. 1, a block diagram is shown illustrating an example, non-limiting embodiment of a communications network 100 in accordance with various aspects described herein. For example, communications network 100 can include one or more servers 102 (or other computing devices) that can facilitate in whole or in part generating a corpus from a plurality of textual documents by applying NLP techniques to the plurality of textual documents such as tokenizing and removing word stops; determining classes from the corpus based on machine learning associated with topic modeling, data clustering analysis and an unsupervised learning process that generates vector representations of words resulting in vectors; generating trained models for each of the classes by determining labels for each of the classes using a cosine similarity function applied to the vectors and by assigning each of the plurality of textual documents to a selected one of the labels based on a highest number of matches of words in each document of the plurality of textual documents to the labels; processing a raw textual document to generate a processed document by applying NLP techniques to the raw textual document; selecting a corresponding model from among the trained models according to a class of the classes that is applicable to subject matter of the raw textual document; and assigning the processed document to a target label of the labels of the corresponding model based on a highest number of matches of words in the raw textual document to the target label. The machine learning associated with topic modeling can be of various types such as LDA topic modeling with different numbers of topics, and the data clustering analysis can be of various types such as K-means clustering. The textual documents can be of various types such as metadata describing media content, which can be obtained from a single source or multiple sources. The labeling of the data can be used for various purposes, such as labeling media content for viewer profiling, engagement modeling, vulnerability modeling, marketing, electronic advertising, programmatic electronic advertising, and so forth.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a process 200 that applies machine learning to characterize data and which can function within the communication network of FIG. 1 in accordance with various aspects described herein. Process 200 can be performed by various devices and combinations of devices that can be operating alone, in parallel and/or in series. As an example, process 200 can be performed by server(s) 102 of system 100 of FIG. 1.

At 201, documents can be obtained, prepared and processed. The documents can be of various types including textual documents. For instance, the documents can be descriptive of content, text of a website, news articles, emails, text messaging, and so forth. In one embodiment, the textual documents can be generated from other documents which can be text or images (e.g., via image pattern recognition). In one embodiment, the documents can be processed by various NPL techniques. For example, the textual documents can be tokenized or parsed. For instance, the tokenizing can break out sentences by words to create a database or collection of words rather than sentences or paragraphs. In another example, stop words can be removed from the textual documents, such as removing prepositions. For instance, a fixed list of stop words can be utilized to implement removal. In other embodiments, the fixed list can be augmented to be specific to the particular type of textual document, such as to a particular type of media content (e.g., a foreign language movie) and/or can be augmented based on special characters associated with the type of textual document. In one or more embodiments, the removal of stop words can be performed based on machine learning or training such as adjusting the removal process or adjusting the list of stop words according to evaluated performance of the removal process to generate an improved word list to remove stop words. In another example, bigram and/or trigram models (or other modeling that assists in recognizing words that should not be split apart) can be utilized to determine words that should remain together (e.g., The Wall Street Journal, The New York Times or an actress's full name). For instance, the bigram and/or trigram modeling can be based upon analyzing the particular textual document to determine if the combination of words appears a threshold number of times to indicate that the combination of words should stay together. The bigram and/or trigram modeling can be applied to a variety of combinations of words, such as "Romantic Drama", and is not limited to names. In another example, Name Entity Recognition (NER) analysis can be applied to the textual documents, which can be a pre-packaged neural network. For example, the NER can identify proper names such as an actor name. In other examples, the NER can recognize 1980's as a date or decade and not just a number. In one example, the NER analysis can be based on the type of textual document, such as metadata descriptive of movies where the content is an Indian movie and so the NER looks for Indian names. In some instances, the NER can be utilized to exclude rather than includes, such as a desire to remove actor names where the class is emphasizing war movies and there is no desire to give particular weight to a particular actor.

At 202, classes or buckets can be established for the corpus that was generated and processed at step 201. In one embodiment, multiple LDA topic models with different numbers of topics can be utilized where each LDA topic model needs to be provided with an expected number of topics. A coherence model can then be executed on all of the LDA topic models to select the best fit of those LDA models for the particular corpus being modeled. While LDA topic modeling is described in this example which can be a generative statistical model that allows sets of observations to be explained by unobserved groups that explain why some parts of the data are similar, other machine learning associated with topic modeling can be utilized in addition to or in place of the LDA modeling such as: explicit semantic analysis which can be based on vectoral representation of text (e.g., individual words or entire documents); latent semantic analysis which includes analyzing relationships between a set of documents and the terms they contain by producing a set of concepts related to the documents and terms; Hierarchical Dirichlet Process (HDP) which includes a nonparametric Bayesian approach to clustering grouped data; and/or non-negative matrix factorization which includes a group of algorithms in multivariate analysis and linear algebra where a matrix is factored into multiple matrices with the property that all three matrices have no negative elements. In one embodiment, the classes (e.g., the enhanced genres) can be created using heuristics where the heuristics are derived using clustering of native genre and keywords.

Continuing with 202, K-means clustering can be applied such as through use of GloVE word embedding or another unsupervised learning algorithm for obtaining vector representations for words. In one embodiment, 300 dimension vectoring can be utilized. This technique allows for clustering of words with similar or related meaning, such as clustering navy, army, and battle with war. In one or more embodiments, the identifying of the classes (e.g., enhanced genres) can be done through use of various clustering and heuristics techniques, which can be performed automatically without the need of assistance from manual labeling.

At 203, feature sets can be determined from the clusters of words for each of the classes using a cosine similarity function, where the feature sets represent the labels. In one embodiment, the applying of the cosine similarity function can be performed utilizing a boosting factor which can be various values (e.g., between three to five).

At 204, trained models can be generated for each of the classes. For example, each of the plurality of textual documents (which were the basis of generating the corpus and the resulting classes and labels) can be assigned to a selected one of the labels via a voting mechanism that counts matches of words to the labels. In one embodiment, the classes and/or labels are non-overlapping and a single class and label is assigned to each textual document. In another embodiment, multiple labels can be assigned per textual document, such as the class of "sitcom" which has labels (e.g., microgenres) of "Animated" and "Science Fiction." The voting mechanism can be based on various techniques such as voting being per word of the processed document (e.g., tokenized and so forth). In this example, the label (e.g., microgenre) which receives the most hits will be assigned with the particular document. Continuing with this example, the trained models can be built per class, so that the particular textual document (e.g., a description of a feature film) is passed through the trained model corresponding to the feature film class and the label for the feature film is identified according to the voting mechanism. In one or more embodiments, the data flow 200 can be utilized to characterize newly received textual documents, such as by applying steps 201 and 204 to the newly received textual document to assign a label from a corresponding model that is selected from the stored trained models according to the class that is associated with the newly received textual document (e.g., a newly received textual document which is an email discussing questions from a subscriber regarding available customer equipment can be labeled utilizing a stored model that corresponds to the class of customer service rather than being labeled utilizing another stored model that corresponds to a class of vendor pricing).

The example of data flow 200 indicates labeling being done at two levels (e.g., class and label which is also referred to in this example as enhanced class and microgenre). However, other embodiments can perform labeling of three or more levels (e.g., class, label and detailed label) by adjusting the trained models and the process to repeat steps (e.g., steps 202 and 203) to generate such a hierarchy. In one or more embodiments, validation of enhanced genre and microgenres can be performed to determine the accuracy of the techniques. This can be done in a number of different ways, including manually. In one or more embodiments, data flow 200 (as well as one or more of the other methods described herein) can be repeated (in whole or in part) such as to generate additional enhanced genre and microgenres. For instance, the process can be repeated with some or all of the documents (including new documents that have been added since the trained models were generated) and new training models can be generated which can be utilized in addition to the previously generated training models for any other documents that will be classified by the process. In one embodiment, new content that is determined (manually or automatically) not to fall within anyone of the enhanced genres or within anyone of the microgenres can trigger the execution of one or more of the methods (in whole or in part) described herein such that a training model is built for a particular microgenre that describes this new content.

While for purposes of simplicity of explanation, the respective processes are shown and described as a series of blocks in FIG. 2A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. In one or more embodiments, the generation of training models that can classify content by genre and microgenre can be robust such that as new content is to be classified (e.g., new movies or shows become available) the training models can be applied to classify the content. In one or more embodiments, certain events can be triggering events for generating new training models, such as newly added content (e.g., based on a historical event that occurs after the training models were generated) that is not easily classified by the existing training models.

Figure 2B:
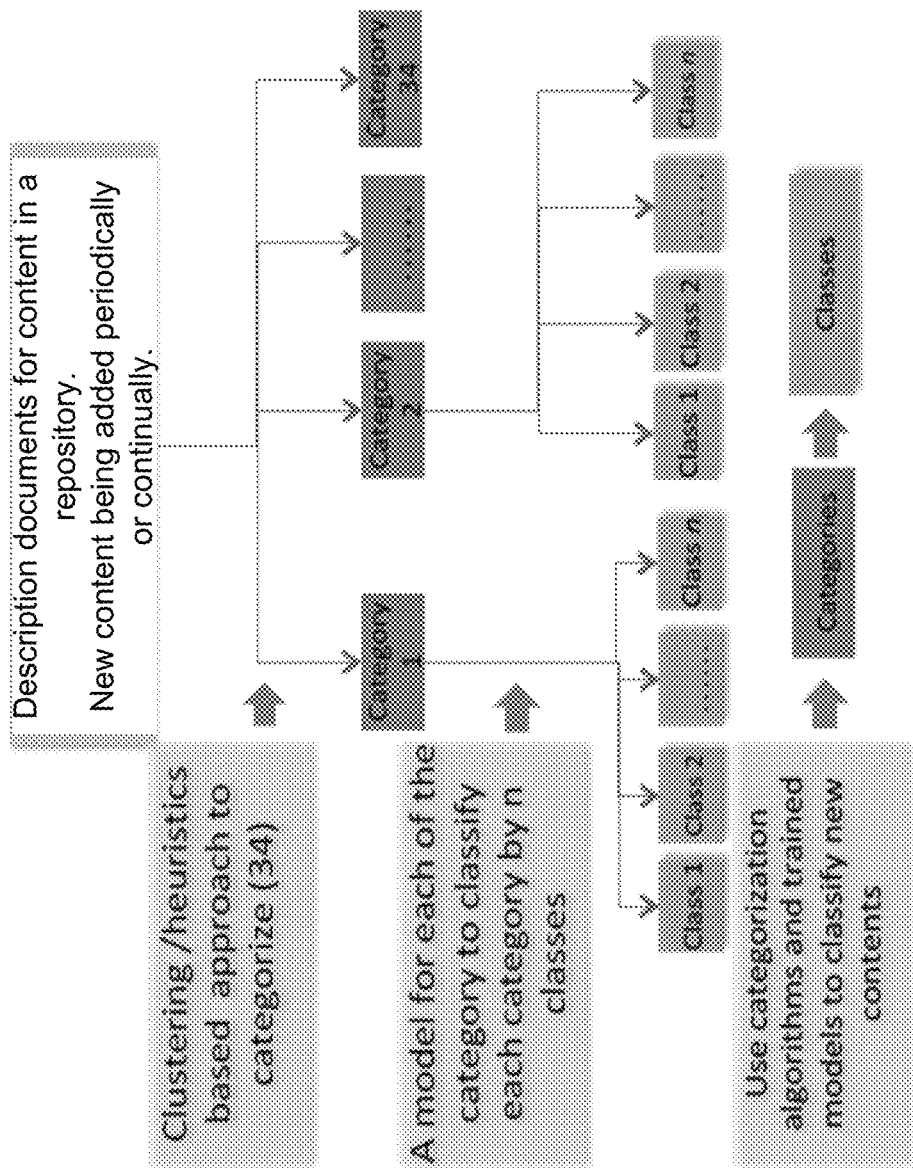
FIG. 2B depicts an illustrative embodiment of a method in accordance with various aspects described herein.

FIG. 2B is a block diagram illustrating an example, non-limiting embodiment of a process 205 that applies machine learning to characterize data and which can function within the communication network of FIG. 1 in accordance with various aspects described herein. Process 205 can be performed by various devices and combinations of devices that can be operating alone, in parallel and/or in series. As an example, process 205 can be performed by server(s) 102 of system 100 of FIG. 1. Process 205 can be performed using one or more of the steps described in process 200 in addition to one or more of the features of process 205 or in place of one or more of the features of process 205.

Process 205 can be utilized for labeling or otherwise characterizing media content into a number of categories and a number of classes. The media content can be from a media catalog or from some listing of content to be described, such as available content through a particular service provider, a content provider, a publisher for advertising purposes, and so forth. In one embodiment, the terms categories and classes of process 205 can correspond to the terms enhanced genre and microgenre of process 200. In one embodiment, 34 categories of media content can be utilized, although other numbers of categories could also be utilized. For example, various clustering and heuristics techniques can be utilized to determine and select the 34 categories. In one embodiment, the categories can be created using heuristics where the heuristics are derived using clustering of native genre and keywords. Each of the categories can have a number of classes, which can be the same number or can be different numbers.

In process 205, the selection of the classes and the particular number of classes for each category can be done in a number of different ways such as through use of machine learning associated with topic modeling (e.g., LDA topic modeling utilizing multiple LDA models having different numbers of topics), data clustering analysis (e.g., K-means clustering) and an unsupervised learning process that generates vector representations of words. Once trained models are built and stored, such as for each of the categories, then newly added content can be labeled by applying the corresponding topic model from among a group of stored topic models that each correspond to one of the categories) to a textual document describing the newly added content, such as applying the topic model for News (illustrated in FIG. 2C) to identify the appropriate class (or microgenre) among multiple classes (or microgenres) that are associated with the news topic model. This process can be performed automatically including determining the particular class (and thus the particular topic model to be applied) in an automated fashion, such as based on a native genre description accompanying or included in the textual document or other textual analysis of the textual document to identify the class.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2C:
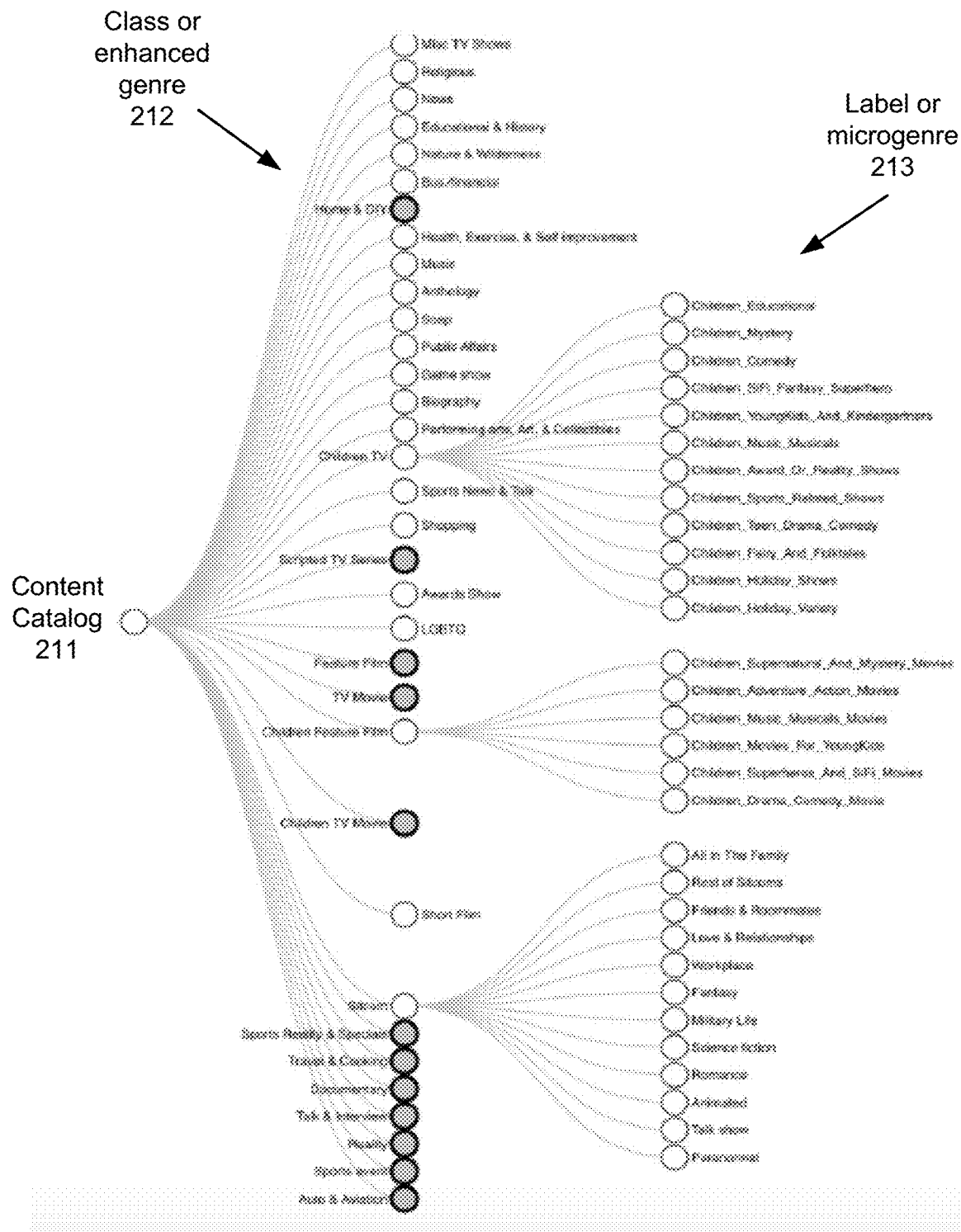
FIG. 2C depicts an illustrative embodiment of a data structure in accordance with various aspects described herein.

FIG. 2C is a block diagram illustrating an example, non-limiting embodiment of a data structure 210 having classes and labels generated by applying machine learning to characterize data and which can function within the communication network of FIG. 1 in accordance with various aspects described herein. Data structure 210 is particular to media content, such as a content catalog 211, but is also applicable to a group of content that is organized in other ways, such as all content available from a particular service provider and so forth. Data structure 210 can be performed by various devices and combinations of devices that can be operating alone, in parallel and/or in series. As an example, data structure 210 can be generated by server(s) 102 of system 100 of FIG. 1. Data structure 210 can be generated using one or more of the steps described in process 200 and/or process 205. Data structure is a two level hierarchy for labeling the media content which includes the enhanced genre 212 and the microgenre 213 (only some of which are illustrated). In one or more embodiments, the processes and techniques described herein can be utilized for generating more than a two level hierarchy such as generating secondary microgenres (for each microgenre); generating tertiary microgenres (for each secondary microgenre); and so forth. This can include repeating one or more of the steps or features described with respect to FIGS. 2A-2C (or other methods described herein) including generating training models that can classify documents into secondary microgenres, tertiary microgenres, and so forth. In one or more embodiments, documents can be classified by more than one microgenre. Various multi-labelling techniques can be utilized in conjunction with the techniques described herein.

FIG. 2D is a block diagram illustrating an example, non-limiting embodiment of a data structure 215 having classes and labels generated by applying machine learning to characterize data and which can function within the communication network of FIG. 1 in accordance with various aspects described herein. Data structure 215 is particular to media content, and can be part of data structure 210 of FIG. 2C. Data structure 215 is a two level hierarchy for labeling the media content which includes the enhanced genre 212 and the microgenre 213 (only some of which are illustrated), and which further illustrates title data and native genre classification to illustrate that the exemplary embodiments provide a more robust description of media content which can be utilized to improve accuracy such as in targeted advertising. In one or more embodiments, other data (e.g., title data and/or native genre classification) can be utilized to facilitate selecting a particular stored topic model that is to be applied to the textual document that is to be labeled.

Figure 2E:
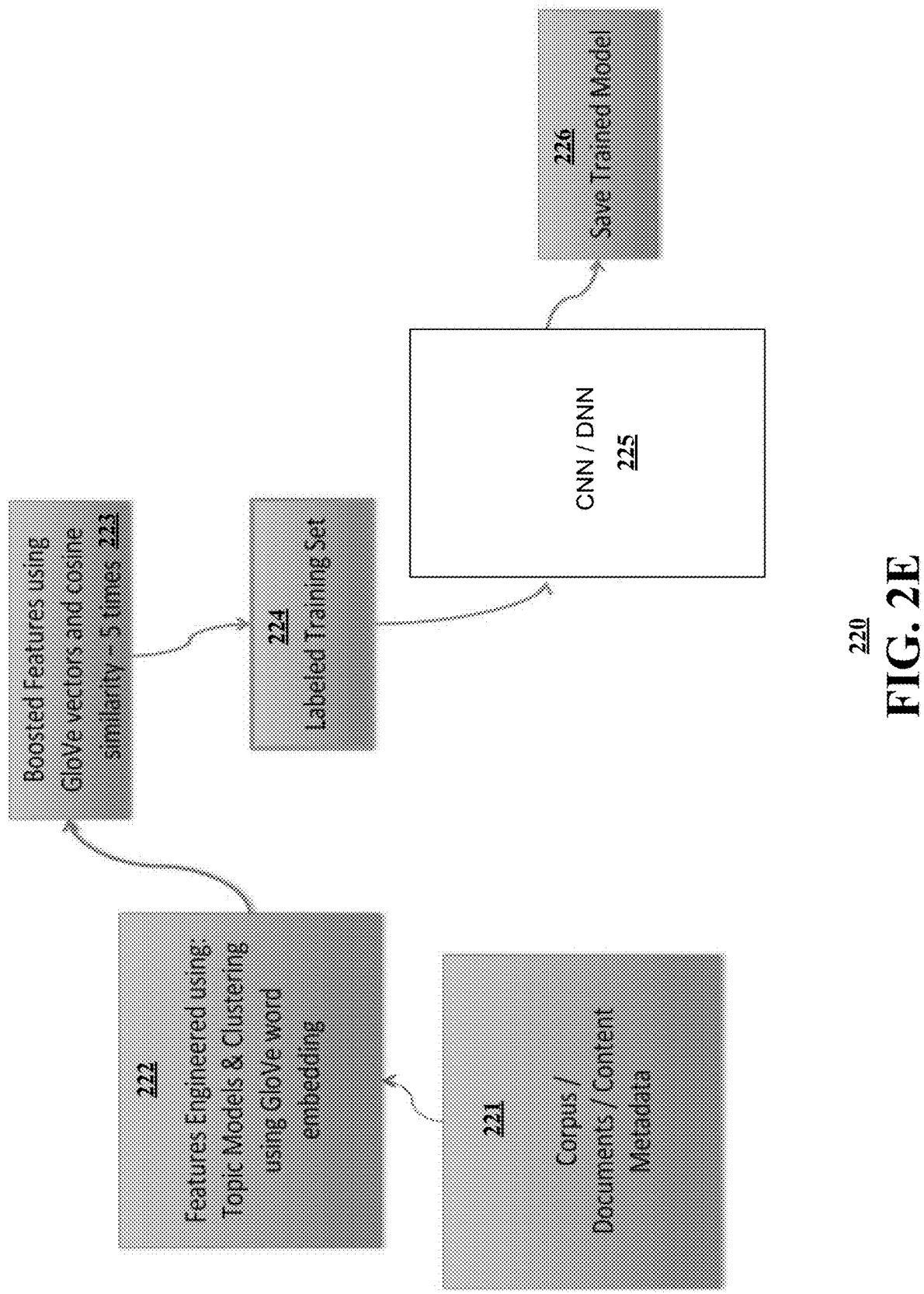
FIG. 2E depicts an illustrative embodiment of a method in accordance with various aspects described herein.

FIG. 2E is a block diagram illustrating an example, non-limiting embodiment of a process 220 that applies machine learning to train models that can be utilized for characterizing data and which can function within the communication network of FIG. 1 in accordance with various aspects described herein. Process 220 can be performed by various devices and combinations of devices that can be operating alone, in parallel and/or in series. As an example, process 220 can be performed by server(s) 102 of system 100 of FIG. 1. Process 220 can be performed using one or more of the steps described in processes 200, 205 in addition to one or more of the features of process 220 or in place of one or more of the features of process 220.

At 221, a corpus of documents can be created, such as for content metadata, although other types of textual documents can also be processed. Various NLP processing can be applied to the textual documents such as tokenizing, removing stop words, applying bigram and/or trigram models, and/or applying NER analysis. At 222, topic modeling and clustering can be applied to the corpus such as fitting multiple LDA topic models to the corpus with varying numbers of topics and comparing these topic models using a coherence model to find a subset of topic models that best fit the data of the corpus. In one embodiment, the topics can be determined using heuristics where the heuristics are derived using clustering of native descriptors and keywords. In one embodiment, the tokenized corpus can be converted into a multi-dimension vector using a pre-trained word embedding process in order to cluster the words into similar meaning groups. This can include generating feature sets from the clusters of words for each of the classes identified from the topic model(s). At 223, each of the features can be boosted using cosine distance by a particular factor (e.g. three to five) to hedge against new content with tokens that are alien to the features and class that were created. At 224-226, a labeled training set can be generated, which can be applied to a neural network such as a convolutional neural network or a deep neural network (e.g., Tensorflow or other CNN or DNN), resulting in stored trained models, such as a trained model for each of the categories of data flow 205 or each of the classes 212 of data structure 210. As an example, a voting mechanism can be used to assign labels to the textual documents according to a particular label having the highest number of votes. Process 220 allows labeling and creating a robust set of labeled data for training prediction models.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2F:
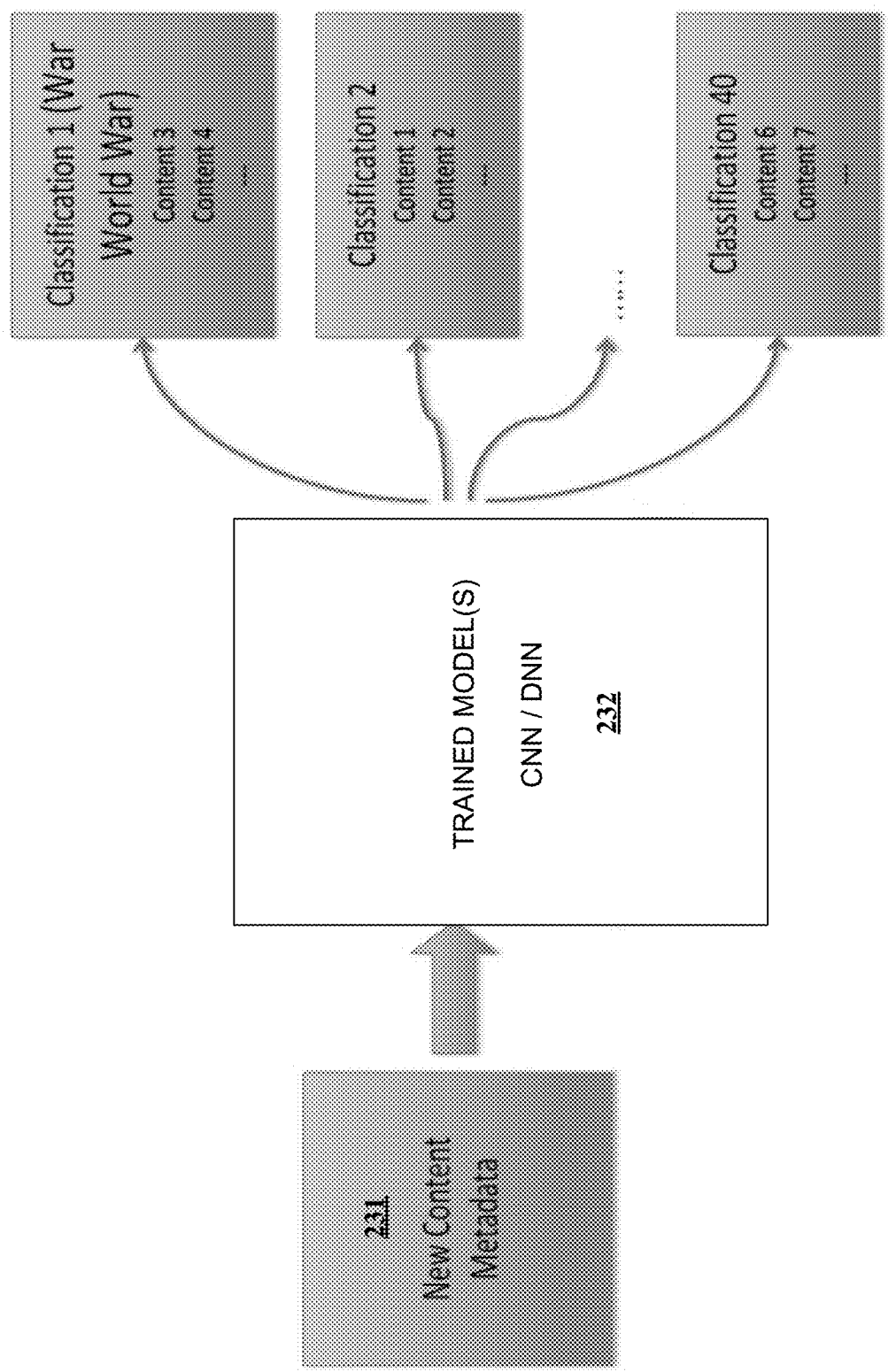
FIG. 2F depicts an illustrative embodiment of a method in accordance with various aspects described herein.

FIG. 2F is a block diagram illustrating an example, non-limiting embodiment of a process 230 that utilizes selected ones of the trained models from process 220 that can be utilized for characterizing data and which can function within the communication network of FIG. 1 in accordance with various aspects described herein. Process 230 can be performed by various devices and combinations of devices that can be operating alone, in parallel and/or in series. As an example, process 230 can be performed by server(s) 102 of system 100 of FIG. 1. Process 230 can be performed using one or more of the steps described in processes 200, 205, 220 in addition to one or more of the features of process 230 or in place of one or more of the features of process 230.

Process 230 is illustrated with respect to a textual document 231 that is content metadata describing particular media content such as a movie, but process 230 can be utilized with other type of textual documents that are to be characterized utilizing trained models 232 that are generated from a corpus of documents of a same type. The selection of the appropriate topic model to be applied to a particular textual document can be done automatically by identifying the topic model, such as based on an analysis of the textual document, keywords of the textual document, a native genre accompanying or otherwise associated with the textual document, and so forth, While for purposes of simplicity of explanation, the respective processes are shown and described as a series of blocks in FIG. 2F, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2G:
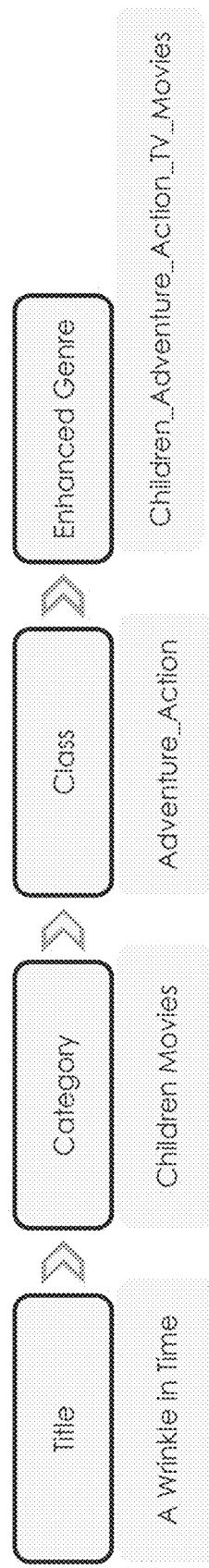
FIG. 2G depicts an illustrative embodiment of a data structure in accordance with various aspects described herein.

FIG. 2G is a block diagram illustrating an example, non-limiting embodiment of a data structure 240 having an enhanced genre (e.g., a label or microgenre in FIGS. 2C and 2D) generated by applying machine learning to characterize data and which can function within the communication network of FIG. 1 in accordance with various aspects described herein. Data structure 240 can be generated by various processes including process 250 described with respect to FIG. 2H. Data structure 240 illustrates an enhanced genre or label (e.g., Children_Adventure_Action_TV_Movies) for a movie that can be generated by the process 250 and that provides for a more robust description of the content as opposed to a native description which says movie or children movies.

Figure 2H:
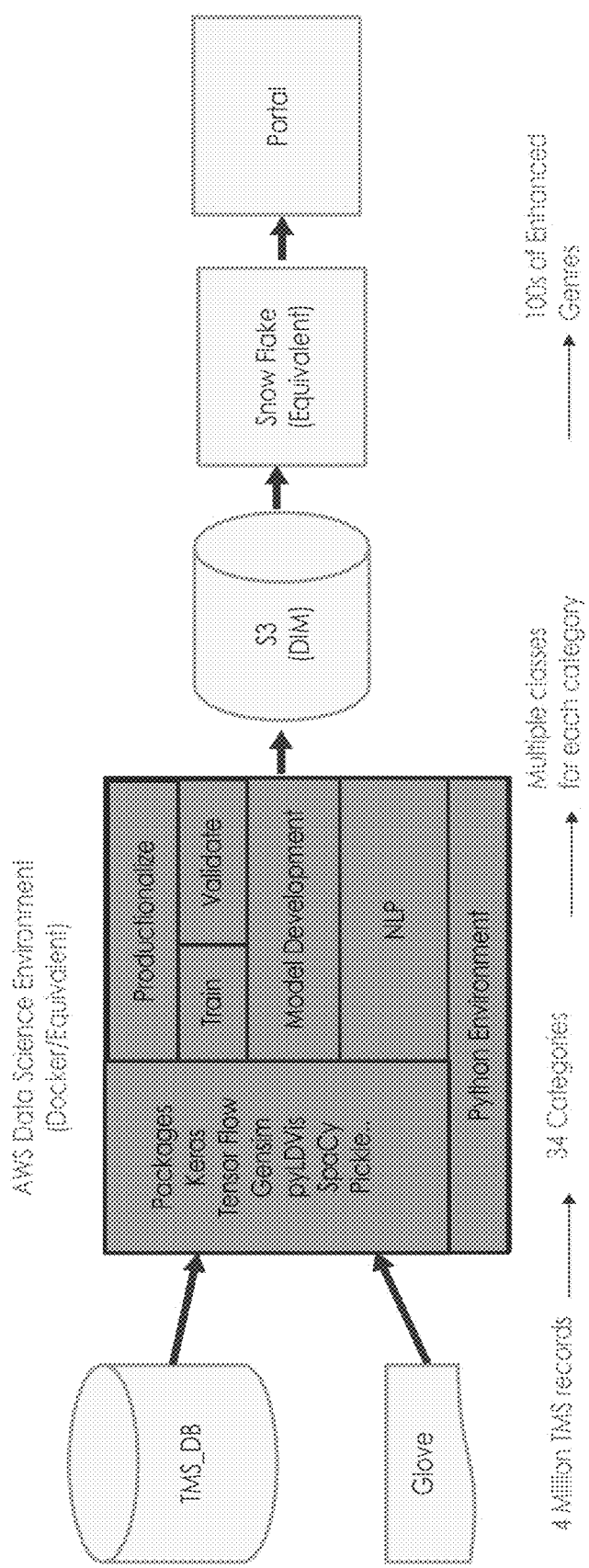
FIG. 2H depicts an illustrative embodiment of a method in accordance with various aspects described herein.

FIG. 2H is a block diagram illustrating an example, non-limiting embodiment of a process 250 that applies machine learning to characterize data and which can function within the communication network of FIG. 1 in accordance with various aspects described herein. Process 250 can be performed by various devices and combinations of devices that can be operating alone, in parallel and/or in series. As an example, process 250 can be performed by server(s) 102 of system 100 of FIG. 1. Process 250 can be performed using one or more of the steps described in processes 200, 205, 220, 230 in addition to one or more of the features of process 250 or in place of one or more of the features of process 250. In one or more embodiments, process 250 can provide or be part of a programmatic content classification system, which can be utilized for discovering content and its audience.

As an example, a number of categories can be generated. The input from one or more content data sources (e.g., TMS data) can be taken and descriptive information such as genre, title, and program type field can be evaluated using a set of heuristic rules. In one embodiment, a particular number of categories can be predetermined, such as based on the techniques described herein such that the input can be classified into one of the categories. For example, if the genre contains the keywords "Nature|Animals|Animal|Wilderness|Outdoors|Agriculture|Environment", it can be classified as belonging to the category "Nature and Wilderness."

Continuing with the example, class creation can then be implemented. For instance in one embodiment, classes can be computed such as for each category that is "heuristic", Genre, title, subject, and so forth. This can be done for each category in a particular bucket utilizing boosted keywords pertaining to each class (e.g., via looking up a j son file and selecting the class with the maximum intersection keywords). Default classes can be computed by assigning the value in the category to the class.

FIG. 2I is a block diagram illustrating an example, non-limiting embodiment of a data structure 270 having categories (e.g., a class or an enhanced genre in FIGS. 2C and 2D) and enhanced genres (e.g., a label or microgenre in FIGS. 2C and 2D) that are generated by applying machine learning to characterize data and which can function within the communication network of FIG. 1 in accordance with various aspects described herein. Data structure 270 can be generated by process 250.

Figure 2J:
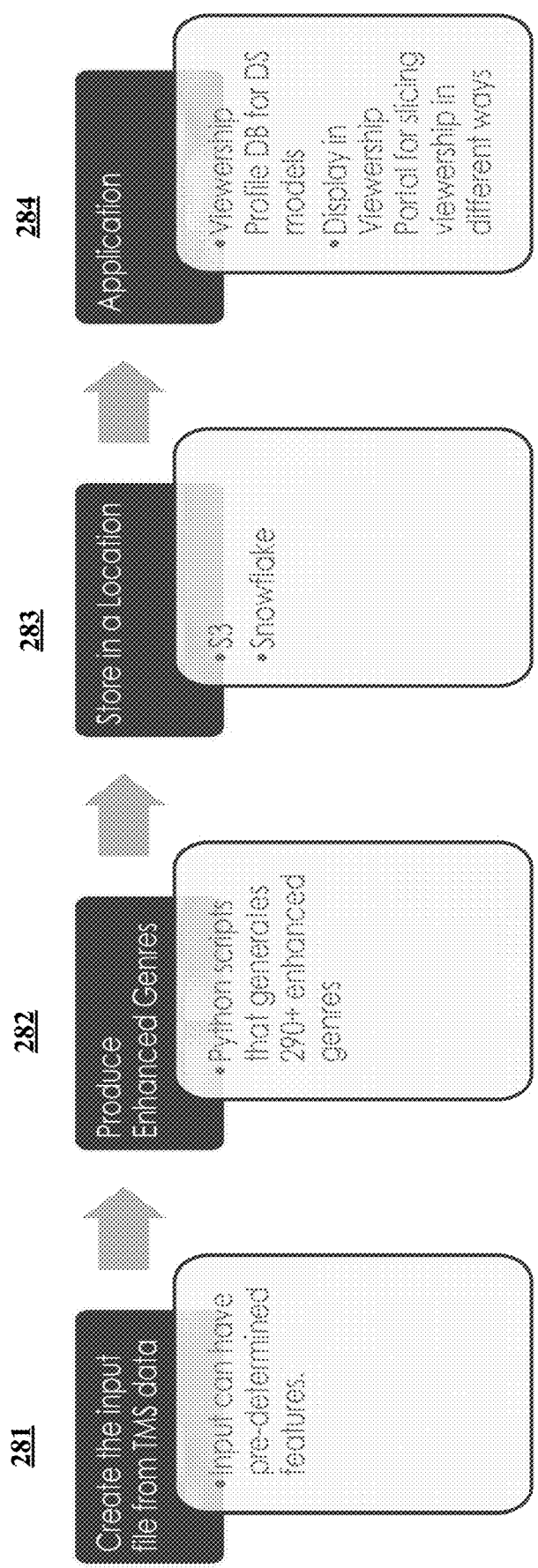
FIG. 2J depicts an illustrative embodiment of a method in accordance with various aspects described herein.

FIG. 2J is a block diagram illustrating an example, non-limiting embodiment of a process 280 that applies machine learning to characterize data and which can function within the communication network of FIG. 1 in accordance with various aspects described herein. Process 280 can be performed by various devices and combinations of devices that can be operating alone, in parallel and/or in series. As an example, process 280 can be performed by server(s) 102 of system 100 of FIG. 1. Process 280 can be performed using one or more of the steps described in processes 200, 205, 220, 230, 250 in addition to one or more of the features of process 280 or in place of one or more of the features of process 280. In one or more embodiments, process 280 can provide or be part of a programmatic content classification system, which can be utilized for discovering content and its audience.

At 281, an input file(s) can be created from content data (e.g., TMS data). As an example, the input features can include one or more of rootid: episode level ID across languages; tmsid: episode level ID; connectorid: show level ID; seriesid: show level ID (across languages); title: title of program; rlseyear—optionally utilized; genre: genre provided by TMS; parentalrating—optionally utilized; ptype: program type of content; character: keywords associated with content; general: keywords associated with content; mood: keywords associated with content; setting: keywords associated with content.

At 282, the data can be processed, such as applying NPL techniques or other methods that facilitate the machine learning process. Enhanced genres (e.g., labels or microgenres in FIGS. 2C and 2D) can then be generated. At 283 the data set can be stored for future use in categorizing content as it is being added to the catalog or otherwise becoming available from the service provider. At 284, the programmatic content classification and its resulting content discovery and audience mapping can be utilized in a number of different ways. For example, viewership profiles can be built for each subscriber, household or other grouping. As another example, this information can be provided in a portal so that it can be analyzed and further categorized for slicing viewership.

As another example, the resulting robust descriptions of the media content can be used to discover different types of content. For example, the detailed descriptions allow for distinguishing different Action TV movies such as based on spies, or different TV Movies such as based on family relationships, and all of the content that are under these labels can be found. The processes described herein enable a better understanding of the interest of viewers in terms of how (e.g., VOD vs broadcast vs DVR) people watch the content under different mircogenres. As another example, the resulting robust descriptions of the media content can be used to develop viewership prediction models, and/or VIBE (Viewership behavior extractor).

The exemplary embodiments described herein, which provide for labeling or otherwise providing a more robust description of data, include a number of potential benefits such as being a generalized technique that is applicable to any collection of documents. Another potential benefit is that a unique set of descriptors, such as enhanced genre and microgenre tags, can be generated and assigned to content of a content catalog, and which can further be utilized for search functions and identification of content. In one embodiment, the process can be used to label any set of documents irrespective of its subject matter. For instance, the process can be used to create labeled training data sets that can be used for website classification, identification of inappropriate web content, customer care communication classifications, email classification as spam or ham, record archiving for an enterprise applicable to its emails, and/or used to forward emails to the correct departments based on its contents, corporate communications, news articles, etc. The exemplary techniques can reduce time, errors, and/or cost associated in creating labeled data sets for supervised predictive models. Another potential benefit is that a hierarchy of tags can be generated (e.g., enhanced genre and microgenres, although other levels of tags can be generated and utilized by repeating particular steps of the exemplary processes) that can be used in an unambiguous manner to identify content. In one embodiment, these tags can be used to create viewership profiles to better serve subscribers with relevant content and/or advertisements. In another embodiment, the tags can also be used as inputs to recommendation systems and/or as a basis for creation of a carousel of contents exposed to each individual Over-The-Top viewer. In one embodiment, the tags can be used in conjunction with or in place of native genres in marketing, targeting, and/or other analytical processes.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, and methods 200, 205, 220, 230, 250, 280 presented in FIGS. 1, 2A, 2B, 2E, 2F, 2H, 2J. For example, virtualized communication network 300 can facilitate in whole or in part generating a corpus from a plurality of textual documents by applying NLP techniques to the plurality of textual documents such as tokenizing and removing word stops; determining classes from the corpus based on machine learning associated with topic modeling, data clustering analysis and an unsupervised learning process that generates vector representations of words resulting in vectors; generating trained models for each of the classes by determining labels for each of the classes using a cosine similarity function applied to the vectors and by assigning each of the plurality of textual documents to a selected one of the labels based on a highest number of matches of words in each document of the plurality of textual documents to the labels; processing a raw textual document to generate a processed document by applying NLP techniques to the raw textual document; selecting a corresponding model from among the trained models according to a class of the classes that is applicable to subject matter of the raw textual document; and assigning the processed document to a target label of the labels of the corresponding model based on a highest number of matches of words in the raw textual document to the target label. The machine learning associated with topic modeling can be of various types such as LDA topic modeling with different numbers of topics, and the data clustering analysis can be of various types such as K-means clustering. The textual documents can be of various types such as metadata describing media content, which can be obtained from a single source or multiple sources. The labeling of the data can be used for various purposes, such as labeling media content for viewer profiling, engagement modeling, vulnerability modeling, marketing, electronic advertising, programmatic electronic advertising, and so forth.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
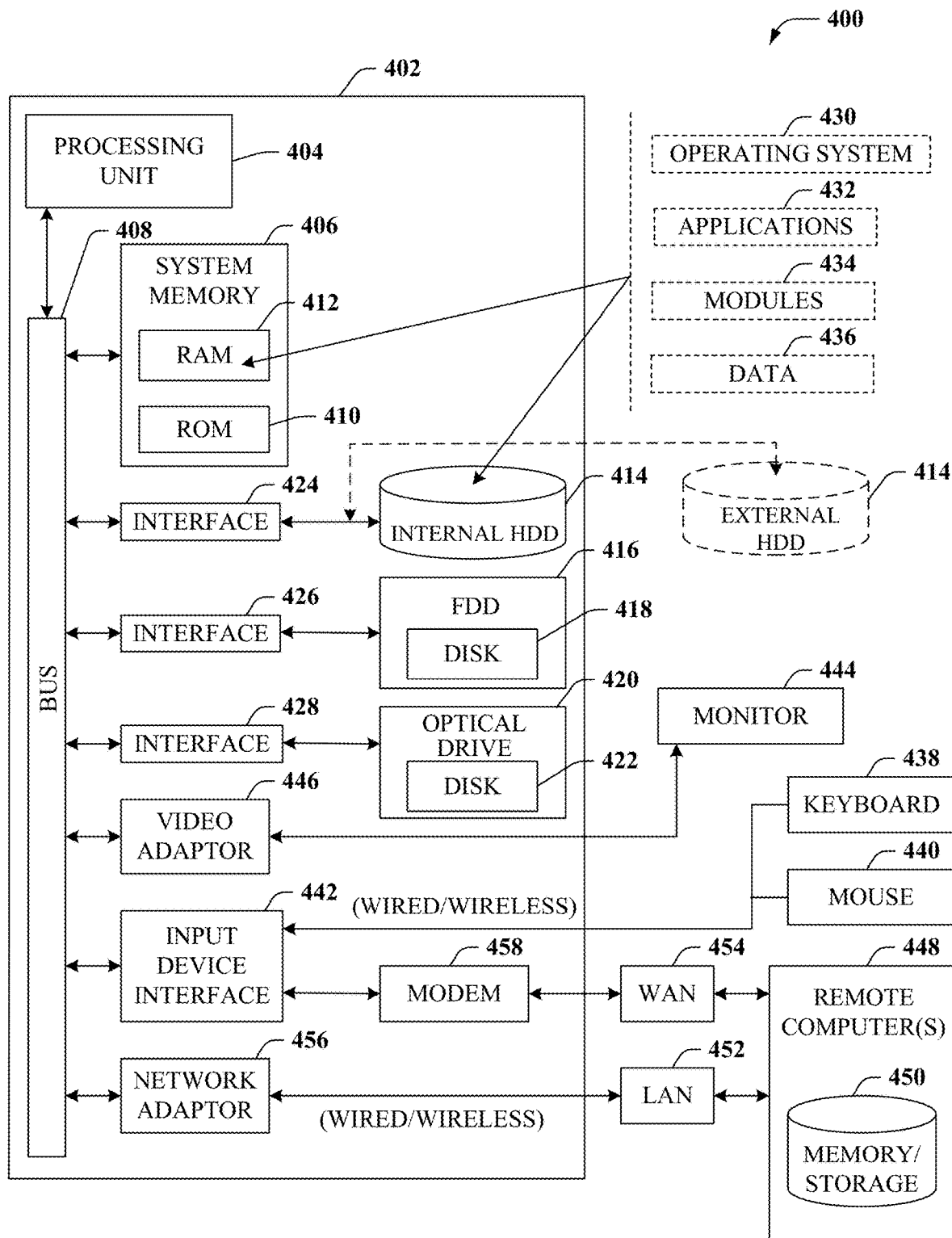
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part generating a corpus from a plurality of textual documents by applying NLP techniques to the plurality of textual documents such as tokenizing and removing word stops; determining classes from the corpus based on machine learning associated with topic modeling, data clustering analysis and an unsupervised learning process that generates vector representations of words resulting in vectors; generating trained models for each of the classes by determining labels for each of the classes using a cosine similarity function applied to the vectors and by assigning each of the plurality of textual documents to a selected one of the labels based on a highest number of matches of words in each document of the plurality of textual documents to the labels; processing a raw textual document to generate a processed document by applying NLP techniques to the raw textual document; selecting a corresponding model from among the trained models according to a class of the classes that is applicable to subject matter of the raw textual document; and assigning the processed document to a target label of the labels of the corresponding model based on a highest number of matches of words in the raw textual document to the target label. The machine learning associated with topic modeling can be of various types such as LDA topic modeling with different numbers of topics, and the data clustering analysis can be of various types such as K-means clustering. The textual documents can be of various types such as metadata describing media content, which can be obtained from a single source or multiple sources. The labeling of the data can be used for various purposes, such as labeling media content for viewer profiling, engagement modeling, vulnerability modeling, marketing, electronic advertising, programmatic electronic advertising, and so forth.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
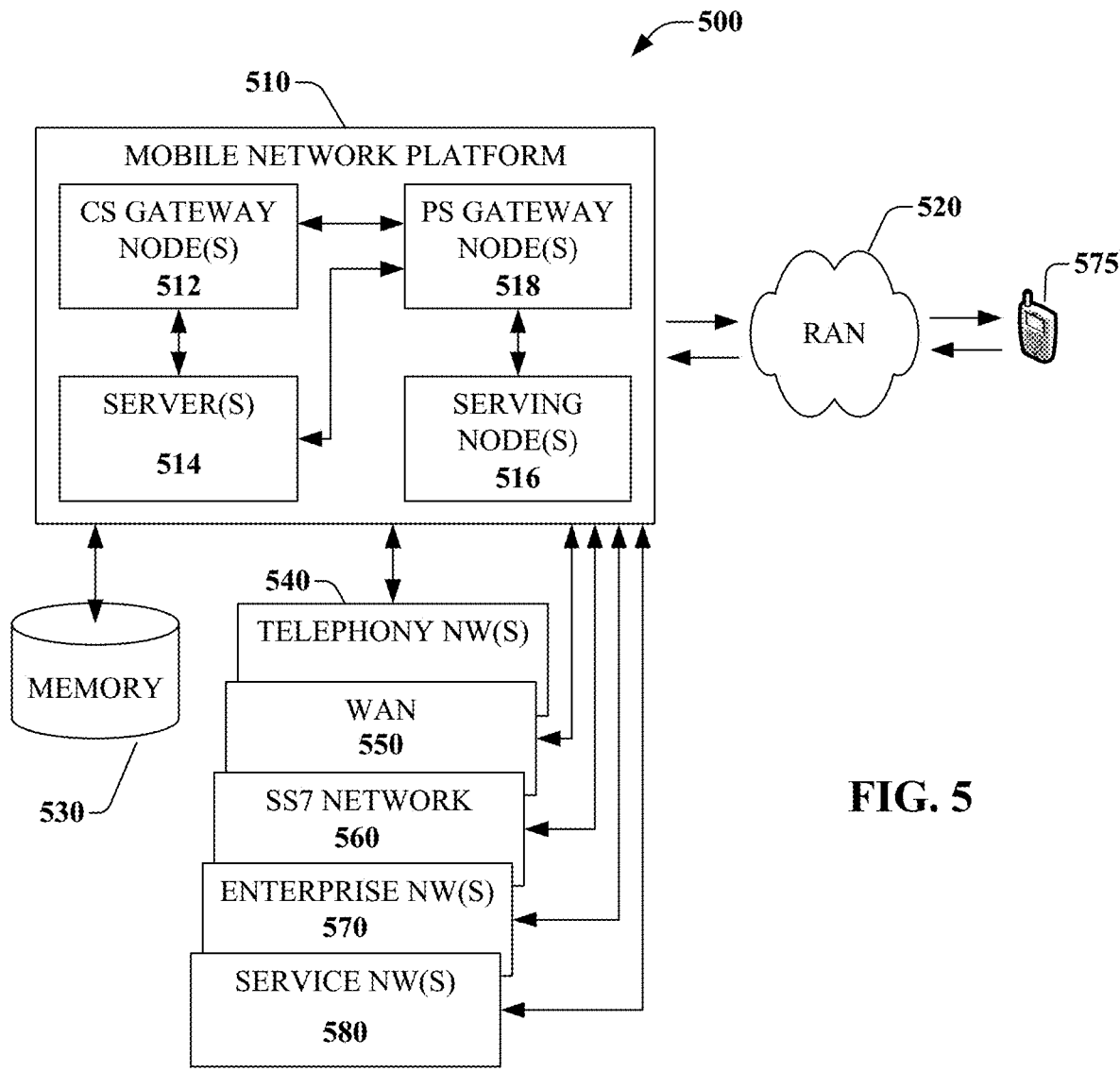
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part generating a corpus from a plurality of textual documents by applying NLP techniques to the plurality of textual documents such as tokenizing and removing word stops; determining classes from the corpus based on machine learning associated with topic modeling, data clustering analysis and an unsupervised learning process that generates vector representations of words resulting in vectors; generating trained models for each of the classes by determining labels for each of the classes using a cosine similarity function applied to the vectors and by assigning each of the plurality of textual documents to a selected one of the labels based on a highest number of matches of words in each document of the plurality of textual documents to the labels; processing a raw textual document to generate a processed document by applying NLP techniques to the raw textual document; selecting a corresponding model from among the trained models according to a class of the classes that is applicable to subject matter of the raw textual document; and assigning the processed document to a target label of the labels of the corresponding model based on a highest number of matches of words in the raw textual document to the target label. The machine learning associated with topic modeling can be of various types such as LDA topic modeling with different numbers of topics, and the data clustering analysis can be of various types such as K-means clustering. The textual documents can be of various types such as metadata describing media content, which can be obtained from a single source or multiple sources. The labeling of the data can be used for various purposes, such as labeling media content for viewer profiling, engagement modeling, vulnerability modeling, marketing, electronic advertising, programmatic electronic advertising, and so forth. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s)

512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
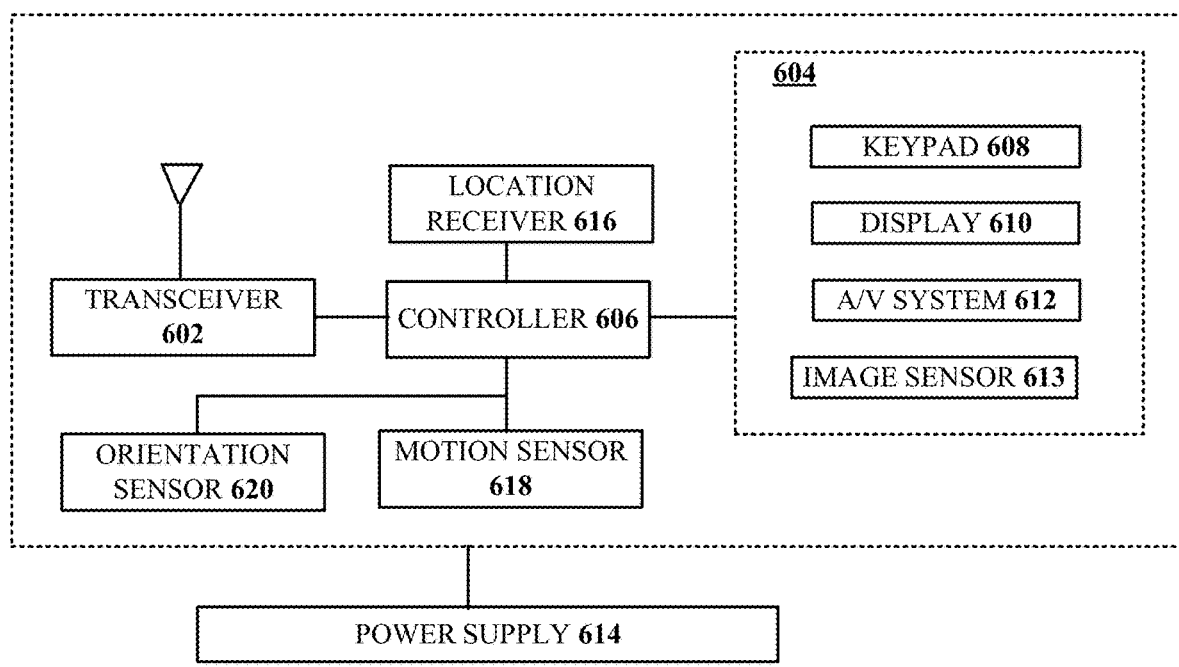
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part generating a corpus from a plurality of textual documents by applying NLP techniques to the plurality of textual documents such as tokenizing and removing word stops; determining classes from the corpus based on machine learning associated with topic modeling, data clustering analysis and an unsupervised learning process that generates vector representations of words resulting in vectors; generating trained models for each of the classes by determining labels for each of the classes using a cosine similarity function applied to the vectors and by assigning each of the plurality of textual documents to a selected one of the labels based on a highest number of matches of words in each document of the plurality of textual documents to the labels; processing a raw textual document to generate a processed document by applying NLP techniques to the raw textual document; selecting a corresponding model from among the trained models according to a class of the classes that is applicable to subject matter of the raw textual document; and assigning the processed document to a target label of the labels of the corresponding model based on a highest number of matches of words in the raw textual document to the target label. The machine learning associated with topic modeling can be of various types such as LDA topic modeling with different numbers of topics, and the data clustering analysis can be of various types such as K-means clustering. The textual documents can be of various types such as metadata describing media content, which can be obtained from a single source or multiple sources. The labeling of the data can be used for various purposes, such as labeling media content for viewer profiling, engagement modeling, vulnerability modeling, marketing, electronic advertising, programmatic electronic advertising, and so forth.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
    generating, by a processing system including a processor, a plurality of textual documents describing content of a media catalog, wherein the generating of the plurality of textual documents comprises applying image pattern recognition to other documents that include text and images;
    generating, by the processing system, a corpus from the plurality of textual documents;
    determining, by the processing system, classes from the corpus based on Latent Dirichlet Allocation topic models having different numbers of topics, K-means clustering and an unsupervised learning process that generates vector representations of words resulting in vectors;
    generating, by the processing system, trained models for each of the classes by determining labels for each of the classes using a cosine similarity function applied to the vectors and by assigning each of the plurality of textual documents to a selected one of the labels via a voting mechanism that counts matches of words to the labels;
    receiving a raw textual document describing other content that has been added to the media catalog;
    processing, by the processing system, the raw textual document to generate a processed document by applying tokenizing, removing stop words, one of bigram and trigram modeling, and name entity recognition analysis to the raw textual document, wherein the applying of the removing of stop words is based on a type of media content corresponding to the other content and comprises an identification of characters associated with a type of the raw textual document;
    selecting, by the processing system, a corresponding model from among the trained models according to a class of the classes that is applicable to subject matter of the raw textual document;
    automatically assigning, by the processing system, the processed document to a target label of the labels of the corresponding model via the voting mechanism that counts matches of words in the processed document to the labels of the corresponding model; and
    generating, by the processing system, engagement modeling, cancellation modeling, or both for one or more subscribers according to consumed content that includes the other content and according to the target label of the other content.

2. The method of claim 1, wherein the generating the corpus comprises processing, by the processing system, a plurality of raw textual documents to generate the plurality of textual documents by tokenizing, removing stop words, applying bigram and trigram models, and applying name entity recognition to the plurality of raw textual documents.

3. The method of claim 2, further comprising obtaining the plurality of raw textual documents from Electronic Programming Guide (EPG) data.

4. The method of claim 1, wherein the determining the labels comprises applying a boosting factor during applying of the cosine similarity function.

5. The method of claim 4, wherein the boosting factor is between three to five.

6. The method of claim 1, further comprising generating a viewer profile for a subscriber according to consumed content that includes the other content and according to the target label of the other content.

7. The method of claim 1, further comprising providing the target label of the other content to a buyer of electronic advertising in an ad space of the other content responsive to the ad space being presented to a user at an end user device.

8. The method of claim 7, wherein the providing of the target label to the buyer of the electronic advertising is part of a programmatic bidding process.

9. The method of claim 1, wherein multiple documents of the plurality of textual documents are assigned to a single label of the labels.

10. A device, comprising:
    a processing system including a processor; and
    a memory that stores executable instructions that, when executed by the processing system, facilitate performance of operations, the operations comprising:
    generating a plurality of textual documents describing content of a media catalog, wherein the generating of the plurality of textual documents comprises applying image pattern recognition to other documents that include text and images;
    applying a group of Latent Dirichlet Allocation (LDA) topic models to a corpus associated with the plurality of textual documents, wherein the LDA topic models have different numbers of topics;
    comparing, via a coherence model, the group of LDA topic models to select a number of labels for classes of the corpus;
    applying, to the corpus, K-means clustering and an unsupervised learning process that generates vector representations of words to cluster the words into similar meaning groups;
    determining feature sets from the clusters of words for each of the classes using a cosine similarity function, wherein the feature sets represent the labels;
    generating trained models by assigning each of the plurality of textual documents to a selected one of the labels via a voting mechanism that counts matches of words in each document of the plurality of textual documents to the labels;
    receiving and processing a raw textual document to generate a processed document by applying tokenizing, removing stop words, one of bigram and trigram modeling, and name entity recognition analysis to the raw textual document, wherein the applying of the removing of stop words is based on a type of media content corresponding to other content described by the raw textual document and comprises an identification of characters associated with a type of the raw textual document;

selecting a corresponding model from among the trained models according to a class of the classes that is applicable to subject matter of the raw textual document;

automatically assigning the processed document to a target label of the labels of the corresponding model via the voting mechanism that counts matches of words in the processed document to the labels of the corresponding model; and generating engagement modeling, cancellation modeling, or both for one or more subscribers according to consumed content that includes the other content and according to the target label of the other content.

11. The device of claim 10, wherein the operations further comprise generating the corpus from the plurality of textual documents, wherein the plurality of textual documents includes emails, descriptions of media content, webpage text, articles, transcriptions of recorded voice messages, closed caption associated with media content or a combination thereof.

12. The device of claim 10, wherein the operations further comprise generating the corpus from the plurality of textual documents and retrieving the plurality of textual documents from an Electronic Programming Guide (EPG) server, and wherein the plurality of textual documents includes descriptions of media content.

13. The device of claim 10, wherein the operations further comprise generating a viewer profile for a subscriber according to consumed content that includes media content that the raw textual document describes and according to the target label.

14. The device of claim 10, wherein the operations further comprise providing the target label to a buyer of electronic advertising in an ad space of the media content responsive to the ad space being presented to a user at an end user device.

15. The device of claim 14, wherein the providing of the target label to the buyer of the electronic advertising is part of a programmatic bidding process.

16. A non-transitory machine-readable medium, comprising executable instructions that, when executed by a processing system including a processor, facilitate performance of operations, the operations comprising:

generating a plurality of textual documents describing content of a media catalog, wherein the generating of the plurality of textual documents comprises applying image pattern recognition to other documents that include text and images;

determining classes from a corpus associated with the plurality of textual documents based on machine learning associated with topic modeling, data clustering analysis and an unsupervised learning process that generates vector representations of words resulting in vectors;

generating trained models for each of the classes by determining labels for each of the classes based on the vectors and by assigning each of the plurality of textual documents to a selected one of the labels based on a highest number of matches of words in each document of the plurality of textual documents to the labels;

processing a raw textual document to generate a processed document by applying Natural Language Processing to the raw textual document, the applying of the Natural Language Processing to the raw textual document comprising applying tokenizing, removing stop words, one of bigram and trigram modeling, and name entity recognition analysis to the raw textual document, wherein the applying of the removing of stop words is based on a type of media content corresponding to other content described by the raw textual document and comprises an identification of characters associated with a type of the raw textual document;

selecting a corresponding model from among the trained models according to a class of the classes that is applicable to subject matter of the raw textual document;

automatically assigning the processed document to a target label of the labels of the corresponding model based on a highest number of matches of words in the raw textual document to the target label; and generating engagement modeling, cancellation modeling, or both for one or more subscribers according to consumed content that includes the other content and according to the target label of the other content.

17. The non-transitory machine-readable medium of claim 16, wherein the generating the trained models includes applying a cosine similarity function to the vectors, wherein the operations further comprise generating the corpus from the plurality of textual documents by applying Natural Language Processing to the plurality of textual documents, wherein the Natural Language Processing applied to the plurality of textual documents includes tokenizing, removing stop words, applying bigram and trigram models, and applying name entity recognition to the plurality of textual documents.

18. The non-transitory machine-readable medium of claim 16, wherein the operations further comprise generating the corpus from the plurality of textual documents by applying Natural Language Processing to the plurality of textual documents, wherein the machine learning associated with topic modeling includes applying Latent Dirichlet Allocation topic models with different numbers of topics, wherein the data clustering analysis includes K-means clustering, and wherein the Natural Language Processing applied to the raw textual document includes tokenizing, removing stop words, applying bigram and trigram models, and applying name entity recognition to the plurality of textual documents.

19. The non-transitory machine-readable medium of claim 18, wherein the operations further comprise generating the corpus from the plurality of textual documents by applying Natural Language Processing to the plurality of textual documents, wherein the plurality of textual documents comprises metadata describing media content, and wherein the plurality of textual documents is obtained from different sources.

* * * * *